UNITED STATES PATENT OFFICE.

MAXIMILIAN GRÄF AND OTTO PESCHEL, OF TEZEL, NEAR BERLIN, GERMANY.

PROCESS OF CASE-HARDENING METALS AND ALLOYS.

1,017,748.  Specification of Letters Patent.  Patented Feb. 20, 1912.

No Drawing.  Application filed October 17, 1910. Serial No. 587,617.

*To all whom it may concern:*

Be it known that we, MAXIMILIAN GRÄF and OTTO PESCHEL, subjects of the German Empire, residing at Tezel, near Berlin, Germany, have invented new and useful Improvements in Processes of Case-Hardening Metals and Alloys, of which the following is a specification.

The process forming the subject of the present invention has for its object the uniform and speedy incorporation of carbon in articles being case hardened. It is based on the recognition of the fact that the incorporation of carbon from the carbonaceous material during the incandescing process must be more efficiently accomplished, the more thoroughly and uniformly the articles are incased by the carbonaceous case hardening material, which is as homogeneous as possible, the more completely and more rapidly the heat is developed in the casing, and the more directly the carbonization of the articles by the case hardening material.

By the new process the use of expensive case hardening materials and mixtures is avoided since the said new process contemplates exclusively the use of small wood in fibered form such as shavings, sawdust, wood-wool or the like or other waste material, the whole or a part of which may if desired be impregnated before use with a suitable liquid ignifuge so as more or less to retard the combustion process. (Examples of such ignifuges are a solution of borax and magnesium sulfate, a solution of sodium silicate or a solution of potassium silicate.)

To the wood after it is dried are added small quantities of soda and colophony solely for keeping clean the surface of the metal to be case hardened, the carbonaceous material amounting to 90-95% of the whole.

Having described our invention what we desire to secure by Letters Patent of the United States is:—

The process of case hardening metals consisting in incasing the metal in small wood in fibered form impregnated with an ignifuge together with additions of soda and colophony and bringing the metal to incandescence.

In testimony whereof we have signed our names to this specification in the presence of two subscribing witnesses.

MAXIMILIAN GRÄF.
OTTO PESCHEL.

Witnesses:
  HENRY HASPER,
  WOLDEMAR HAUPT.